(12) United States Patent
Grosch et al.

(10) Patent No.: US 12,109,612 B2
(45) Date of Patent: Oct. 8, 2024

(54) ADDITIVE MANUFACTURING METHOD

(71) Applicant: Ford Global Technologies, LLC, Dearborn, MI (US)

(72) Inventors: Guenter Hans Grosch, Vettweiß (DE); Bas van den Heuvel, Limburg (DE); Andreas Kuske, Geulle (DE); Richard Fritsche, Wermelskirchen (DE); Wilbert Hemink, Limburg (DE); Rainer Lach, Wuerselen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 177 days.

(21) Appl. No.: 17/101,929

(22) Filed: Nov. 23, 2020

(65) Prior Publication Data
US 2021/0154917 A1    May 27, 2021

(30) Foreign Application Priority Data
Nov. 21, 2019 (DE) .......................... 102019131423.2

(51) Int. Cl.
| B22D 23/00 | (2006.01) |
| B22D 27/04 | (2006.01) |
| B22F 10/22 | (2021.01) |
| B33Y 40/00 | (2020.01) |
| B33Y 10/00 | (2015.01) |

(52) U.S. Cl.
CPC .............. *B22F 10/22* (2021.01); *B33Y 40/00* (2014.12); *B33Y 10/00* (2014.12)

(58) Field of Classification Search
CPC ...... B22D 23/00; B22D 23/003; B22D 27/04; B22F 10/22; B29C 64/129; B29C 64/188; B29C 64/268; B29C 64/393
USPC .......... 164/48, 492, 122, 124, 125, 126, 128
See application file for complete search history.

(56) References Cited

U.S. PATENT DOCUMENTS

| 2015/0064047 | A1 | 3/2015 | Hyde et al. |
| 2018/0093350 | A1 | 4/2018 | Koch et al. |
| 2018/0126632 | A1 | 5/2018 | Bonatsos et al. |
| 2018/0264731 | A1 | 9/2018 | Kritchman et al. |
| 2018/0264750 | A1* | 9/2018 | Tierney et al. ........ B33Y 50/02 |
| 2019/0255766 | A1* | 8/2019 | Takeyama et al. ... B29C 64/393 |

FOREIGN PATENT DOCUMENTS

| CN | 106270515 A | 1/2017 |
| CN | 107511481 | 12/2017 |
| CN | 107685440 | 2/2018 |
| CN | 106270515 B | 6/2018 |

* cited by examiner

*Primary Examiner* — Kevin P Kerns
(74) *Attorney, Agent, or Firm* — Burris Law, PLLC

(57) ABSTRACT

A method of additive manufacturing an object by applying metal layerwise on a base with an application device successively aligned with different processing zones in relation to the base includes locally applying liquid metal in a processing zone. The liquid metal solidifies in the processing zone and precise adjustment of local material properties of the object are controlled by influencing or controlling temperature development as a function of time of the solidified metal with at least one thermal influencing device aligned with the processing zone and fixed relative to the application device. The thermal influencing device is at least one of a heating device and a cooling device.

20 Claims, 3 Drawing Sheets

ADDITIVE MANUFACTURING METHOD

CROSS-REFERENCE TO RELATED APPLICATIONS

This application claims priority to and the benefit of German Application No. 102019131423.2, filed on Nov. 21, 2019. The disclosure of the above application is incorporated herein by reference.

FIELD

The present disclosure relates to a method of additively manufacturing an object.

BACKGROUND

The statements in this section merely provide background information related to the present disclosure and may not constitute prior art.

There are currently various methods by means of which, on the basis of design data, three-dimensional models may be produced from shapeless or shape-neutral materials such as powders (optionally with the addition of a binder) or liquids (which also sometimes includes molten solids). These methods are also known by collective terms such as rapid prototyping, rapid manufacturing or rapid tooling. Often, a primary shaping step is carried out, during which the starting material is either already present as a liquid from the outset or is liquefied beforehand and then set at an intended position. One known method in this case is so-called melt coating (fused deposition modeling, FDM) in which a workpiece is constructed layerwise from thermoplastic. The plastic is delivered, for example in powder form or in filament form, melted and applied in molten form by a printing head which successively applies individual layers, in general horizontal layers, of the object to be produced.

Methods have recently been developed in which, instead of a thermoplastic, a metal in liquid form is applied and subsequently solidified. In this way, a metal object may be constructed successively, and the construction may be carried out layerwise. In contrast to powder bed methods such as selective laser sintering (SLS) or selective laser melting (SLM), in which a powder is applied and then selectively heated and sintered, or fused by suitable focused radiation, there is no constraint to construction along parallel layers. In powder bed methods, large amounts of unused metal powder are incurred during the course of the production process, which need to be removed from the finished object and from the production region and either disposed of or recycled for further use. The issue of unused metal powder does not arise in the controlled local application of liquid metal, i.e. these methods are substantially more economical in this regard. The metal may be delivered in the form of a filament or wire, and melted before it is locally applied pointwise.

In this case, individual drops of the metal may be produced and ejected under pressure through a nozzle in the manner of a jet printer. The nozzle is directed at the desired application point, at which the respective drop subsequently sets.

The aforementioned methods are also suitable for the production of prototypes, there being almost no restrictions in terms of shape. It also being possible to produce parts that could also be produced by deforming methods (for example as shaped sheet-metal parts). In series production, production by deforming is in general substantially more economical, while for prototypes or very small batch numbers additive manufacturing is in general more economical and less difficult. However, components which have been produced by additive manufacturing, although they may correspond exactly to the outer shape e.g. of a shaped sheet-metal part, may not have the same material properties as components made by deforming because of the entirely different production process. This is because the deforming process locally modifies the material properties by locally differing stresses. For instance, highly deformed regions generally have a greater hardness and tensile strength than those regions which are deformed less. This is due to so-called work hardening, it being possible for dislocations in the metal lattice to migrate to and accumulate at the grain boundaries because of the deformation. In contrast, material properties such as hardness and strength are normally about equal everywhere inside an additively manufactured component.

U.S. Published Application No. 2015/0064047 A1 discloses a method for producing a three-dimensional structure. A metallic material is applied, for example in the form of a jet of liquid metal, at a printing location. Furthermore, a microstructure of the material is adjusted at the printing location by controlling a supply of heat energy to the printing location and controlling the supply of ultrasound vibrations to the printing location. Optionally, cooling of the printing location may also be provided, for example by supplying a coolant to the printing location.

CN 107511481 A discloses an integrated method for 3D printing and heat treatment of ultralong metal parts. According to one variant, a longitudinal axis of the metal part is aligned along a diagonal of a base face defined by a metal substrate. According to another variant, the longitudinal axis of the metal part is aligned along a body diagonal above the base face. Both methods lead to optimized use of the space of a given manufacturing installation.

U.S. Published Application No. 2018/0093350 A1 discloses an additive manufacturing method, an object being manufactured by metal powder being applied layerwise (i.e., layer by layer) onto a base body by an application device in a manufacturing region along a construction surface, regionally melted by a laser beam and solidified while at least one endless conveyor transports the base body with the object forward along a transport direction from the construction surface. The endless conveyor transports the base body with the finished object to an extraction region, where at least the object is extracted from the endless conveyor. Supporting structures, which are connected to the base body and produced on the object are removed after reaching the extraction region.

A method for producing a material with a functional gradient is known from CN 107685440 A. In this case, an object is constructed layerwise from a polymer such as PEEK (poly ether ether ketone), which is extruded. Local laser irradiation of the extruded polymer is subsequently carried out. Locally differing microstructures are produced by adapting the intensity of the laser.

U.S. Published Application No. 2018/0126632 A1 discloses an additive manufacturing device having a reservoir for a colloidal suspension of material in a liquid carrier and at least one printing head having a multiplicity of nozzles, each of which is adapted to dispense the suspension dropwise onto a substrate. Drying means are arranged next to the printing head and are adapted to supply a first energy pulse selectively to an applied drop in order to evaporate liquid. Melting means are arranged next to the drying means and are adapted to supply a second energy pulse selectively in order to melt the material in a drop dried by the drying means.

An additive manufacturing method having a reservoir for manufacturing material as well as a feed line, which leads to a printing head having a plurality of nozzles, is known from U.S. Published Application No. 2018/0264731 A1. A regulator controls the pressure of the manufacturing material in the printing head. A separator is adapted to recover at least a part of the manufacturing material from a mixture of air and manufacturing material. A return line connects the separator to the reservoir in order to allow recycling of manufacturing material.

CN 106270515 A discloses an integrated method for 3D printing, heat treatment and waste treatment. In this case, layerwise 3D printing is carried out, as well as heat treatment when a layer thickness required therefor has been reached. Correspondingly, erosive processing is only carried out when a layer thickness sufficient therefore has been reached. For complicated three-dimensional shapes, the process of erosive processing is carried out layerwise, instead of on the entirely finished object, by means of which the manufacturing precision is intended to be improved.

SUMMARY

This section provides a general summary of the disclosure and is not a comprehensive disclosure of its full scope or all of its features.

It should be pointed out that the features and measures mentioned individually in the following description may be combined with one another in any desired technologically feasible way and represent further configurations of the present disclosure. The description additionally characterizes and specifies the present disclosure, particularly in connection with the figures.

The present disclosure provides an additive manufacturing method. For example, a method of providing precise adjustment of local material properties for an object manufactured by liquid metal printing is provided. The method may belong to the field of rapid prototyping, or rapid manufacturing. It is suitable in particular for the manufacturing of prototypes, or individual models, but also for series manufacturing, particularly in the case of small batch numbers.

In one form of the present disclosure, an object is manufactured by metal being applied layerwise on a base, by an application device being successively aligned with different processing zones in relation to the base and liquid metal being locally applied in one of the different processing zones and solidifying there. In this context, a "metal" refers to any material that comprises at least one metal. Besides a pure metal (i.e. a single chemical element), it may also be an alloy of different metals. Such an alloy may also contain semimetals or nonmetals. Non-limiting examples of metals include copper, magnesium, aluminum, titanium, iron and alloys thereof. The metal is applied layerwise onto a base, i.e. a first layer is applied directly onto the base, after which further layers are applied successively onto one another. For some metals, for example in the case of magnesium, the application is carried out in a protective gas atmosphere. The base is typically configured as a construction platform, or base platform, which generally has a planar surface on which the first metal layer is applied. The respective layers may be configured in a planar fashion and extend horizontally (i.e. perpendicularly to the direction of gravity), although nonplanar layers, as well as layers that are inclined with respect to the horizontal, are also possible. Depending on the type of object manufactured, an applied layer may be configured as a surface ("two-dimensionally"), linearly ("one-dimensionally") or even as a point ("zero-dimensionally"). The indications in terms of the dimension are of course not to be interpreted in the exactly mathematical sense, since any layer has a finite volume and to this extent is three-dimensional.

The layerwise application is carried out by an application device being successively aligned with different processing zones in relation to the base and liquid metal being applied respectively in the different processing zones. A processing zone corresponds to a two-dimensional position within a layer, or to a three-dimensional position relative to the base. As an alternative, a processing location or processing coordinates could also be referred to. During the manufacturing method, the application device is successively aligned with different processing zones and applies metal in liquid form respectively in each of the different processing zones. This means that the metal has previously been liquefied, i.e. melted, which may be done either in the application device itself or in an external device, which is connected to the application device by a delivery system. Typically, the metal is delivered in solid form, for example as a powder or wire, to the application device and is then melted by the latter. The application may, in particular, be carried out by dispensing, spraying or projecting a jet or individual drops of liquid metal from the application device into the different processing zones. In some variations of the present disclosure, the application device may be referred to as a printing head of a jet printer and the method may be classified as liquid metal printing.

The liquid metal solidifies in the processing zone and therefore forms a volume element of the object. It bonds to the metal of the underlying layer (or, in the case of the bottom layer, to the base). The application device is successively aligned with other processing zones, which means that the position of the application device in relation to the base is modified. The application device may be moved while the base remains fixed. As an alternative or in addition, however, a position change of the base is also possible. In the case of a planar base, for example, the application device could be moved within a two-dimensional plane parallel to a plane of the base in order to construct a layer, while the base may be moved perpendicularly to this plane in order to lower the object by one layer thickness, for example after the construction of a layer. Normally, one layer is respectively completed before the next layer, lying above it in relation to the base, is applied. It would, however, also be possible to apply the next layer regionally even before a layer has been completed, since in contrast to powder bed methods the layer construction does not depend on the application of a continuous layer of flowable material. This may offer a time saving, especially when the movement paths in the vertical direction are much shorter than in the horizontal direction. Process improvement may therefore be achieved and the manufacturing time may be shortened.

Normally, the application device processes a surface, different movement patterns being possible. For example, the outer contour of a surface may be processed first, followed by its interior, or vice versa. The entire surface could also be scanned to some extent in a checkerboard fashion or stripwise. It is to be understood that the movement of the application device relative to the base is controlled according to predetermined data (for example CAM (Computer Aided Manufacturing) data) of the object to be produced. The processed surface, in which metal is applied, in this case corresponds to a (generally planar) cross section of the object. Overall, the object may be composed a subsequently usable portion and connecting structures, or supporting structures, which connect the usable portion to the base. The connecting structures may be used for mechanical support of the object during manufacturing and/or to dissipate heat from the object into the base. The connecting structures are removed after the end of the additive manufacturing, for example by erosive processing.

After the application of the metal, its temperature development as a function of time is influenced or controlled by at least one thermal influencing device aligned with the processing zone, in order to locally adjust mechanical properties of the object. The thermal influencing device influences (controls) the temperature development of the metal as a function of time, i.e., it acts on the applied metal in such a way that the way in which the temperature of the metal varies as a function of time is influenced (in a non-negligible way) as a result thereof. For many alloys, as well as some pure metals, the microstructure (i.e. the crystal structure or the lattice structure) of the solid metal depends on the conditions under which the metal has solidified, or cooled. In particular, the initial temperature of the cooling process, the duration of the cooling and the—possibly not constant—cooling rate are important in this case. If the metal were merely applied in liquid form by the application device and were subsequently solidified, there would be no possibility of influencing the cooling process. This would either constantly take place in the same way or would be influenced by the dissipation of heat from the processing region, which in turn depends on the cross section of the adjacent parts of the object and their temperature. That is to say, the same microstructure would be formed everywhere in the object, or alternatively a structure which does differ locally but in an uncontrolled way. This is inhibited or prevented by the action of the at least one thermal influencing device. That is, the thermal influencing device influences the temperature development, so that it is in turn possible to influence the microstructure of the metal in the processing zone and therefore the local properties of the metal, for example strength and hardness. While the thermal influencing device is influencing the temperature development, it is aligned with the processing zone in which metal has previously been applied, i.e. the thermal influencing device acts in a controlled way rather than on the object in its entirety. This, however, is not to be interpreted as meaning that the thermal influencing device only influences the temperature development in a processing zone. It is to be understood that neighboring regions are normally also influenced, if only because of heat transfer. It is also in general not possible to specify an exact temperature development, or an exact temperature profile, but rather this is possible only with a certain inaccuracy. It has, however, been found that the achievable accuracy is sufficient in order to locally influence the microstructure of the metal, and therefore its properties.

In the method according to the present disclosure, the thermal influencing device and the application device are kept fixed relative to one another during the manufacturing. That is to say that, at least during the manufacturing, the thermal influencing device and the application device are kept fixed relative to one another, and they are kept in a constant position relative to one another. They may be part of a processing unit which is moved in its entirety relative to the base during the manufacturing, so that the application device and the thermal influencing device can be successively aligned with different processing zones. The application device and the at least one thermal influencing device (as parts of the processing unit) may be permanently connected rigidly to one another. It would, however, also possible for a relative position of the two devices to be adjustable, either manually or by at least one actuator. If such a possibility of adjustment is provided, this does not however take place during the manufacturing. The thermal influencing device may be part of a device which is partially not kept fixed relative to the application device. For example, the thermal influencing device may, for the purpose of influencing the temperature, direct a beam, which is originally generated outside the thermal influencing device, onto the processing zone. In this case, the element by which the point of action of the influencing of the temperature development is determined (for example an optical alignment arrangement for a laser beam, an outlet nozzle for a fluid flow, or the like) is regarded as the thermal influencing device which is kept fixed relative to the application device.

That is to say, the relative position of the application device and the thermal influencing device remains the same during the application of the metal, the influencing of its temperature development and during the position variation for alignment with a further processing zone. This offers clear advantages. For instance, during the manufacturing merely one position is adjusted of adopted, instead of at least two positions in the case of devices that can be moved independently of one another. This is advantageous insofar as a respective position of the thermal influencing device should be provided with high precision, which places great demands on the accuracy of the actuators involved. Furthermore, at least limited deadjustment relative to the base may sometimes be harmless, so long as the positioning of the thermal influencing device and of the application device relative to one another is exact. Such deadjustment merely leads to the object in its entirety being offset relative to the base, which is harmless at least in the case of minor differences. Movement errors which may occur when adopting a position also do not influence the alignment of the thermal influencing device, or influence it only insubstantially. The same applies for the influence of vibrations and thermal expansion of component parts.

Since the at least one thermal influencing device and the application device are normally also arranged spatially close to one another as parts of a processing unit, the geometrical arrangement of component parts that are associated with the thermal influencing device, in particular lines or conductors of various types, may be compact. The delivery paths of processing media and auxiliary media for the aforementioned devices may therefore advantageously be made short, which can contribute to improving the process dynamics, response behavior and process precision.

There are many applications of the method according to the present disclosure. In particular, it may be used to additively manufacture an object and at least approximately replicate the mechanical properties of an object produced by deforming (stamping, pressing, forging, etc.). In some variations, the object is manufactured according to a template which corresponds to a deformed metal part, the regions of different hardness being established on the basis of a hardness profile of the deformed metal part due to the deforming. The template may be regarded abstractly as a dataset, from which the shape of the metal part and the hardness of individual regions are obtained. Because of the deforming, locally differing hardnesses are adjusted in such a metal part, i.e. a hardness profile, which is generally dictated by the deforming. Normally, regions which have been deformed more have a higher hardness than regions which have been deformed less. Ideally, the hardnesses given in the template according to the hardness profile may be reproduced more or less exactly by the additive manufacturing of the object. It may, however, also be sufficient for the hardness profile to be reproduced at least approximately, or qualitatively. In each case, by additive manufacturing it is possible to obtain a component which corresponds not only in terms of the outer shape but also in terms of its mechanical properties, at least approximately, to a deformed metal part. It is therefore possible to produce a single corresponding object or a very limited batch number, without the corresponding deforming having to be carried out for this purpose, and therefore without the generally space- and cost-intensive deforming system being needed.

In some variations, the thermal influencing device influences the temperature development at least partially after the solidification of the metal. That is to say, the metal is applied and solidified and the thermal influencing device acts or influences the temperature of the metal at least after the solidification. This is expedient insofar as the configuration of the microstructure is determined primarily or entirely by processes below the melting point. It is, however, possible for the thermal influencing device to act already before the solidification of the metal, in which case the solidification may even be accelerated or retarded by the action of the thermal influencing device.

In some variations, heat is delivered to the metal in the processing zone by at least one thermal influencing device configured as a heating device. The term "heating device" in this context includes any type of device which is suitable for locally delivering heat to the metal in the processing zone. This may generally take place by heat transfer (by thermal radiation, thermal conduction and/or convection) or by transmitting another form of energy onto the metal in the processing zone, the energy subsequently being converted into heat inside the metal.

The heating device may deliver the heat in particular by means of a laser beam, an electron beam, a flame or an electric arc. The laser beam may be focused onto a small region in the processing zone and is suitable for delivering large amounts of energy in a short time. Furthermore, the amount of energy delivered may be dosed by regulating the intensity of the laser or, in the case of a pulsed laser, by the pulse length and frequency. Thus, heating, temperature maintenance or controlled cooling may selectively be achieved. Furthermore, the thermal power delivered may be varied as a function of time. Similar possibilities are available with an electron beam, which may likewise be focused and allows variable irradiation of different amounts of energy. A flame may be generated by a burner, which may be directed at the processing zone. In general, heat is transferred into a relatively large region around the processing zone, which may sometimes also be advantageous. Because of the electrical conductivity of the applied metal, the heat may also be delivered by means of an electric arc. In order to allow controlled transfer to the processing zone, an electrode of the thermal influencing device must normally be arranged in the immediate vicinity of the processing zone, while a counter-electrode may for example be connected to the base. In particular when only relatively small amounts of heat need to be delivered, the heating device could also deliver the heat with the aid of a fluid flow, for example a gas flow, the temperature of which lies above the room temperature.

As already mentioned above, the microstructure of the metal is normally determined by processes below the melting temperature. In another aspect, however, it may be advantageous for the heating device to remelt the metal in the processing zone after the solidification. This generally has the effect that the metal in the processing zone fuses with surrounding regions, so that enhanced bonding between the individual regions is provided and a smoother surface structure may be achieved. Furthermore, the melting provides that, even in the event of a time delay between the solidification of the metal and the action of the heating device, a sufficiently high temperature of the metal is achieved in order to adjust a desired microstructure subsequently by means of a suitable cooling process.

In some variations, cooling of the metal in the processing zone, which is retarded by the delivery of heat, takes place during the delivery of heat. That is to say, the delivery of heat is dimensioned in such a way that, although cooling takes place, this cooling is nevertheless retarded relative to a cooling process without the delivery of heat. This may mean that the cooling takes place with a lower rate overall. As an alternative or in addition, the cooling may temporarily be interrupted by the delivery of heat so that the temperature of the metal remains constant or temporarily increases. By such retardation of the cooling, for example, microstructures with a lower hardness may be produced. Furthermore, stresses in the metal, which could detrimentally influence the stability of the component, may sometimes be reduced.

According to a further configuration, heat is extracted from the metal in the processing zone by at least one thermal influencing device configured as a cooling device. The term "cooling device" in this context includes any type of device which is suitable for locally extracting heat. Normally in this case, heat transfer primary takes place from the metal in the processing zone to a different, cooler, material which removes the heat by thermal conduction and/or convection, or absorbs heat by a phase transition, for example evaporation or sublimation. The cooling of the metal is accelerated by the action of cooling device. This may sometimes be regarded as quenching of the metal. A particularly hard structure is normally produced by such quenching.

The mode of action of the cooling device could, for example, consist in contacting, i.e. touching, the metal in the processing zone and thereby extracting heat from it, principally by thermal conduction. In this case, the cooling device may in turn, for example, comprise internal liquid cooling or Peltier cooling. In some variations, the cooling device extracts the heat by a fluid flow directed onto the processing zone. The fluid flow flows onto or around the processing zone, the fluid flow absorbing heat from the metal if its temperature is lower than that of the metal. The fluid flow may comprise at least one gas and/or at least one liquid. In at least one variation, air may be used as a gas, or alternatively an inert gas which inhibits oxidation of the metal. For example, water may be used as a liquid. The use of other liquids is, however, also possible, for example liquids with a relatively low boiling point (for example below 300° C.), so that it evaporates when it impinges on the metal in the processing zone. In particular, the fluid flow may be formed as an air flow, as a humid air flow, or as a water jet.

In some variations, the thermal influencing device includes a heating device and a cooling device to act successively on the same processing zone. Normally, in this case at least one heating device acts first and at least one cooling device acts after this. For example, a temperature increase may be envisioned, which like austenitization in the case of steel sets the lattice structure into a precursor stage from which it is possible to achieve different lattice structures by cooling, depending on the cooling rate and duration. It could also be that the temperature increase remelts the metal and its lattice structure may therefore be fully reformed. As an alternative or in addition, the heating device may also act after the cooling device, for example in order initially to cool the metal rapidly and then to stabilize its temperature, or retard the cooling. In this context, many variants may be envisioned, for example even time-interleaved action of the cooling and heating devices.

In some variations, the application device and the thermal influencing device are aligned with different positions. In this case, the application device could initially be aligned with a particular processing zone and the metal could be applied there. For the action of the thermal influencing device, the application device and the thermal influencing device would then be moved together (for example as part of a processing unit) relative to the base, in order to align the thermal influencing device with the processing zone. In this case as well, the relative position of the application device with respect to the thermal influencing device remaining constant during the manufacturing process would have an advantageous effect. In order to simplify the manufacturing process further, however, the application device and the at least one thermal influencing device are aligned simultaneously with the same processing zone, and for the thermal influencing device to influence the temperature development of the metal in the processing zone before the application device is aligned with a subsequent processing zone. That is to say, realignment of the thermal influencing device and application device is not needed for the action of the thermal influencing device. In this way, time is saved and/or the precision is increased, since the alignment of the thermal influencing device with the corresponding processing zone is not affected by possible inaccuracies that could occur because of realignment of the processing unit.

In one form of the present disclosure, a method of additive manufacturing an object includes applying liquid metal layerwise on a base using an application device aligned with a processing zone of the base such that the liquid metal is applied locally on the processing zones and solidifies, and influencing temperature of the solidified metal as a function of time with at least one thermal influencing device aligned with the processing zone such that mechanical properties of the object are adjusted such that the thermal influencing device and the application device are fixed relative to one another during manufacture of the object.

In some variations, the thermal influencing device influences the temperature development at least partially after the solidification of the metal.

In at least one variation, the at least one thermal influencing device is a heating device heat that delivers heat to the metal in the processing zone. In such variations, the heating device can deliver the heat in the form of a laser beam, an electron beam, a flame, or an electric arc. Also, the heating device can remelt the solidified metal in the processing zone. And cooling of the metal in the processing zone can be retarded by delivery of the heat.

In some variations, the at least one thermal influencing device is a cooling device that extracts from the metal in the processing zone. In such variations, the cooling device can extract the heat with a fluid flow directed onto the processing zone.

In at least one variation, the at least one thermal influencing device is a heating device and a cooling device heating and cooling, respectively, the metal in the processing zone.

In some variations, the application device and the at least one thermal influencing device are aligned simultaneously with the processing zone, and the thermal influencing device influences the temperature of the metal in the processing zone before the application device is aligned with another processing zone.

In at least one variation, the method further includes applying liquid metal layerwise onto a plurality of processing zones of the base and the liquid metal is applied locally on each of the plurality of processing zones and solidifies. In such variations, the temperature of the solidified metal is influenced as a function of time with the at least one thermal influencing device aligned with each of the plurality of processing zones such that mechanical properties of the object are adjusted, and the thermal influencing device and the application device are fixed relative to one another during manufacture of the object. In some variations, the at least one thermal influencing device is a heating device heating the metal in at least a subset of the plurality of processing zones. In other variations, the at least one thermal influencing device is a cooling device cooling the metal in at least a subset of the plurality of processing zones. And in at least one variation the at least one thermal influencing device is a heating device and a cooling device heating and cooling, respectively, the metal in at least a subset of the plurality of processing zones. In some variations, the application device and the at least one thermal influencing device are aligned simultaneously with each of the plurality of processing zones, and the thermal influencing device influences the temperature of the metal in each of the plurality of processing zones before the application device is aligned with another one of the plurality of processing zones.

In another form of the present disclosure, a method of additive manufacturing an object includes applying liquid metal layerwise on a base using an application device aligned successively with a plurality of processing zones of the base such that the liquid metal is applied locally and solidifies on each of the plurality of processing zones, and influencing temperature of the solidified metal on at least a subset of the plurality of processing zones as a function of time with at least one thermal influencing device aligned successively with the plurality of processing zones such that mechanical properties of the object are adjusted. Also, the thermal influencing device and the application device are fixed relative to one another during manufacture of the object.

In some variations, the at least one thermal influencing device is a heating device and a cooling device heating and cooling, respectively, the metal in at least a subset of the plurality of processing zones. In such variations, the application device and the at least one thermal influencing device are aligned simultaneously with each of the plurality of processing zones, and the thermal influencing device influences the temperature of the metal in each of the plurality of processing zones before the application device is aligned with another one of the plurality of processing zones.

In still another form of the present disclosure, a method of additive manufacturing an object includes applying liquid metal layerwise onto a plurality of processing zones on a base using an application device aligned successively with the plurality of processing zones such the liquid metal is applied locally and solidifies on each of the plurality of processing zones. The method also includes influencing temperature of the solidified metal on at least a subset of the plurality of processing zones as a function of time with a heating device and a cooling device aligned successively with the plurality of processing zones such that mechanical properties of the object are adjusted, and the thermal influencing device and the application device are fixed relative to one another during manufacture of the object.

In some variations, the application device, the heating device, and the cooling device are aligned simultaneously with each of the plurality of processing zones, and at least one of the heating device and the cooling device influences the temperature of the metal in one of the plurality of processing zones where the liquid metal is applied locally before the application device is aligned with another one of the plurality of processing zones.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

Further advantageous details and effects of the present disclosure are explained in more detail below with the aid of the figures, in which FIG. 1 shows a schematic representation of a first device for carrying out the method according to one form of the present disclosure;

Figure 1:
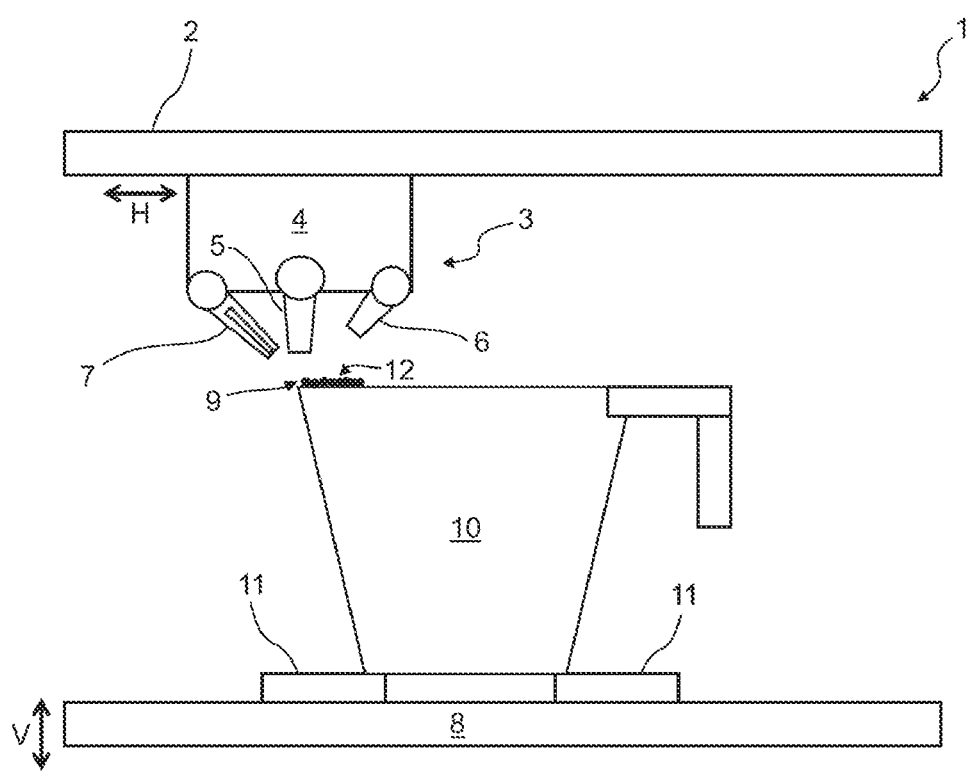

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the various figures, parts which are the same are always provided with the same references, for which reason they will generally be described only once.

FIG. 1 shows a first device 1 for carrying out the method according to one form of the present disclosure. The representation is greatly simplified and schematized. Arranged on a stationary rail 2, there is a carriage 4 of a processing unit 3, which can be moved by a motor relative to the rail 2 along a horizontal H. For simplicity, a single rail 2 is represented here, although a system of at least two rails 2 arranged at a right angle to one another, which allows two-dimensional movement within the horizontal H, can be provided. A printing head 5, which may also be referred to as an application device, a heating device 6 and a cooling device 7 are fastened to the carriage 4. The device 1 furthermore comprises a base 8 configured as a planar plate, which can be moved along a vertical V. The device 1 is used for the additive manufacturing of an object 10, which is connected to the base by means of connecting structures 11.

Figure 2A:
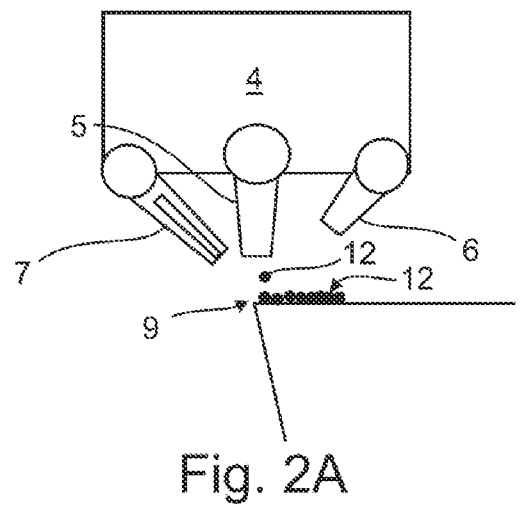
FIG. 2A shows a detail view of the device of FIG. 1 in a first method step.

The additive manufacturing of the object 10 (including the connecting structures 11) is carried out by layerwise application of metal 12. In order to apply the metal 12, the printing head 5 is respectively aligned with a processing zone 9 and dispenses one or more drops of liquid metal 12 into or on the processing zone 9, as indicated in FIG. 2A. In some variations, the metal 12 is delivered to the printing head 5 in solid form, for example as a wire, and liquefied inside the printing head 5, before it is sprayed under pressure in the manner of a jet printer. The metal 12 cools and solidifies in the processing zone 9, so that it forms a volume element of the object 10. The printing head 5 may subsequently be aligned with a further (another) processing zone 9 by horizontal movement of the carriage 4 and/or by vertical movement of the base 8.

Figure 2B:
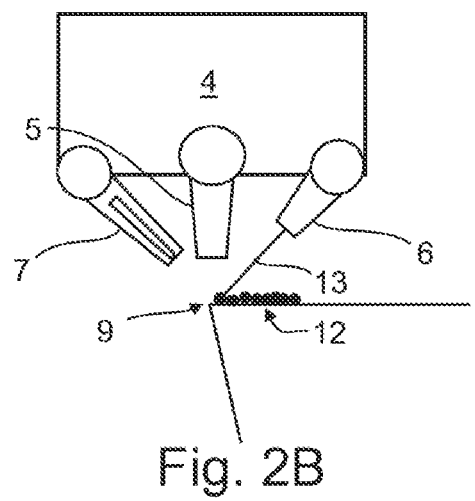
FIG. 2B shows a detail view of the device of FIG. 1 in a second method step.

In at least one variation, the heating device 6 is configured to emit a laser beam 13, it being possible for the actual generation of the laser beam 13 to take place outside the processing unit and for the laser beam 13 to be conveyed to the heating device by light guides (not represented here). The heating device 6 is aligned with the same processing zone 9 as the printing head 5, i.e., upon activation the laser beam 13 strikes the metal 12 in the processing zone 9, as represented in FIG. 2B. Throughout the manufacturing, the heating device 6 and the printing head 5 remain fixed relative to one another, so that they are always aligned with the same processing zone 9 regardless of the position of the carriage 4. Heat is locally delivered to the metal 12 by absorption of the laser beam 13. Depending on the intensity and duration of action of the laser beam 13, cooling of the metal 12 may thereby be retarded or the metal 12 may be heated. For example, the metal 12 in the processing zone 9 may be remelted. In this way, the bonding to neighboring regions of the object may be improved, and a smooth surface structure may be produced. The latter has the advantage that subsequent erosive processing of the object 10 may be unnecessary, or may be less difficult.

Irrespective of whether or not melting takes place, the temperature may be increased to such an extent that the microstructure of the metal 12 (a lattice structure or a crystal structure) is converted into a state from which different microstructures may be adjusted or obtained depending on the nature of the subsequent cooling, in a similar way as in the austenitization of steel. Accordingly, various options are available, which may also be partially combined with one another. For example, the laser beam 13 could act on the processing zone 9 with a lower intensity or intermittently, so that retarded cooling would be possible. In this way, a low hardness and a high ductility of the metal 12 are normally adjusted. As an alternative, the process of cooling the metal 12 could take place without active influencing. The cooling rate would in this case depend above all on the temperature of the adjacent part of the object 10 and on the cross section, which is crucial for the dissipation of heat.

Figure 2C:
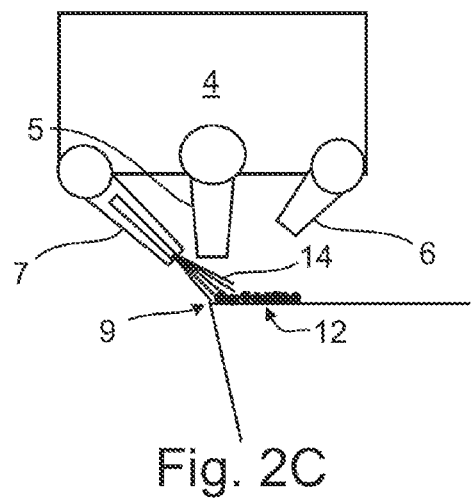
FIG. 2C shows a detail view of the device of FIG. 1 in a third method step.

In some variations, active cooling may be carried out by the cooling device 7. In at least one variation, the cooling device 7 comprises a nozzle which is connected to a delivery channel (not represented here), through which cooling air is delivered from a source (not represented here) normally arranged outside the processing unit 3. This acts as a cooling air flow 14 on the metal 12 in the processing zone 9 (see FIG. 2C) and leads to cooling thereof. The cooling device 7 is aligned with the same processing zone 9 as the printing head 5 and the heating device 6, and is fixed relative to them. By the action of the air flow 14, the cooling of the metal 12 is accelerated significantly relative to purely passive cooling, so that a different microstructure is adjusted or obtained. This normally leads to an increased strength and reduced ductility. The process may sometimes also be regarded as quenching of the metal 12 in the processing zone 9. Any action on or modification of the microstructure of metal 12 outside the processing zone 9 is small, however, because this has previously not been heated, or has been heated only to a small extent, since heat is delivered to the processing zone 9 in a controlled way by the heating device 6.

When the action of the heating device 6 and of the cooling device 7 on the processing zone 9 is completed (i.e., when heating and/or cooling on the processing zone 9 is complete), the printing head 5 is aligned with a further (another) processing zone 9 by the carriage 4 being moved, in which case the base 8 may optionally be lowered.

A control unit (not shown) controls both the movements of the carriage 4 and of the base 8 and the use of the printing head 5, of the heating device 6 and of the cooling device 7. In particular, the heating device 6 and the cooling device 7 may be used in a different way as a function of computer-aided manufacturing (CAM) control data, which the control unit accesses, depending on the position of the processing zone 9 relative to the base 8. This includes the heating device 6 and/or the cooling device 7 not being used for some processing zones 9 and/or used differently on different processing zones 9. In this way, locally differing mechanical properties of the object 10 may be adjusted. One possibility is that a hardness profile which at least approximates the hardness profile of an object produced by deforming is thereby produced, highly deformed regions having a higher hardness.

Optionally, it is possible for the printing head 5, the heating device 6 and/or the cooling device 7 to be fixed releasably to the carriage 4, adjustment (normally manual adjustment) being possible. It is to be understood that such adjustment is not carried out during the manufacturing of the object 10, but before or after a manufacturing process.

Figure 3:
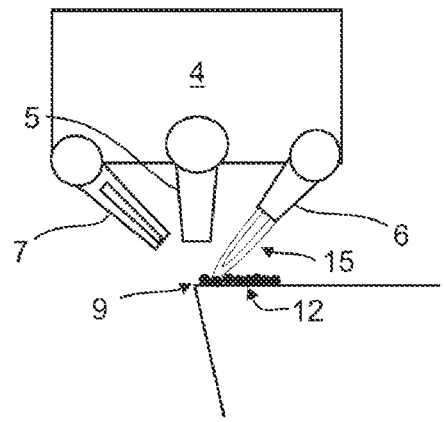
FIG. 3 shows a detail view of a second device for carrying out the method according to another form of the present disclosure.
Figure 4:
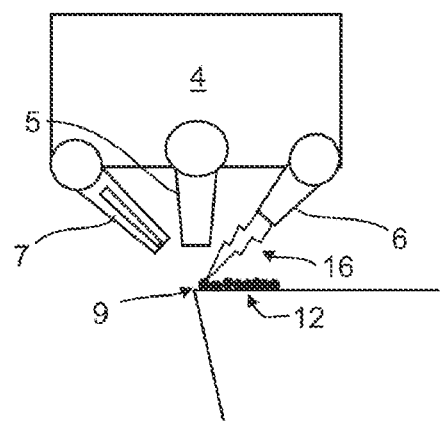
FIG. 4 shows a detail view of a third device for carrying out the method according to still another form of the present disclosure.

As an alternative to a laser beam 13, an electron beam can be used in order to deliver heat to the processing zone 9. A further alternative is represented in FIG. 3, in which the heating device 6 comprises a burner that generates a flame 15. In this way as well, both retarded cooling and heating or even remelting of the metal 12 in the processing zone 9 may be achieved. It is furthermore possible for the delivery of heat to be carried out by means of an electric arc 16, as schematically represented in FIG. 4. In this case, the heating device 6 comprises an electrode, while a counter-electrode may be connected to the base 8.

Figure 5:
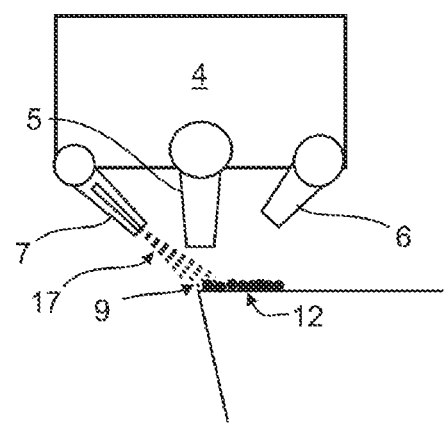
FIG. 5 shows a detail view of a fourth device for carrying out the method according to still yet another form of the present disclosure.
Figure 6:
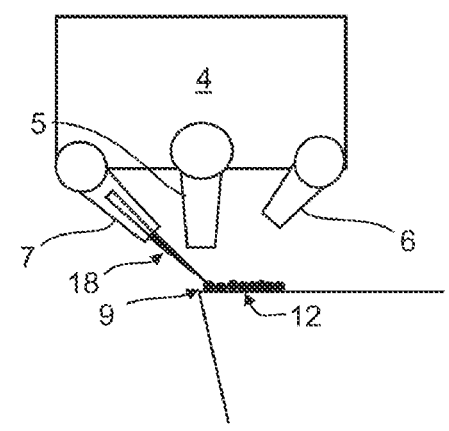
FIG. 6 shows a detail view of a fifth device for carrying out the method according to another form of the present disclosure.

Instead of a simple air flow 14, a humid air flow 17 may also be used for cooling the metal 12 in the processing zone 9, as represented in FIG. 5. Such a humid air flow 17 has a higher heat capacity and can furthermore absorb heat by evaporation of the water contained. Even more rapid cooling of the processing zone 9 is therefore possible. Furthermore, the cooling may be carried out by a water jet 18, as represented in FIG. 6. This in turn has an even higher heat absorbing capacity and can furthermore be restricted more accurately to the processing zone 9 than an air flow 14 or a humid air flow 17. Instead of water, a different liquid could also be used for cooling, for example liquids with a relatively low boiling point (for example below 300° C.), so that it evaporates when it impinges on the metal 12 to be cooled. Instead of an air flow 14 or a humid air flow 17, a flow of a different gas or gas mixture could also be used. This could for example be an inert gas, by the use of which possible oxidation of the metal 12 is inhibit or prevented.

Unless otherwise expressly indicated herein, all numerical values indicating mechanical/thermal properties, compositional percentages, dimensions and/or tolerances, or other characteristics are to be understood as modified by the word "about", "approximately" or "substantially" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of additively manufacturing a metallic object, the method comprising:
    applying metal as a liquid and layerwise on a base using an application device aligned with a processing zone of the base, wherein the metal is applied locally on the processing zone and subsequently solidifies; and
    controlling temperature of the metal as a function of time with at least one thermal influencing device aligned with the processing zone such that a localized microstructure and mechanical properties of the object are adjusted, wherein the at least one thermal influencing device and the application device are fastened to a carriage and fixed relative to one another during manufacture of the object.

2. The additive manufacturing method according to claim 1, wherein the at least one thermal influencing device controls the temperature of the metal after solidification of the metal.

3. The additive manufacturing method according to claim 1, wherein the at least one thermal influencing device is a heating device that delivers heat to solidified metal in the processing zone.

4. The additive manufacturing method according claim 3, wherein the heating device delivers the heat in the form of a laser beam, an electron beam, a flame, or an electric arc.

5. The additive manufacturing method according to claim 4, wherein the heating device remelts the solidified metal in the processing zone.

6. The additive manufacturing method according to claim 4, wherein cooling of the solidified metal in the processing zone is retarded by delivery of the heat.

7. The additive manufacturing method according to claim 1, wherein the at least one thermal influencing device is a cooling device that extracts heat from the solidified metal in the processing zone.

8. The additive manufacturing method according to claim 7, wherein the cooling device extracts the heat with a fluid flow directed onto the processing zone.

9. The additive manufacturing method according to claim 1, wherein the at least one thermal influencing device is a heating device and a cooling device, heating and cooling, respectively, solidified metal in the processing zone.

10. The additive manufacturing method according to claim 1, wherein the application device and the at least one thermal influencing device are aligned simultaneously with the processing zone, and the at least one thermal influencing device controls the temperature of solidified metal in the processing zone before the application device is aligned with another processing zone.

11. The additive manufacturing method according to claim 1 further comprising:
applying liquid metal layerwise onto a plurality of processing zones of the base, wherein the liquid metal is applied locally on each of the plurality of processing zones and solidifies; and
controlling the temperature of solidified metal as a function of time with the at least one thermal influencing device aligned with each of the plurality of processing zones such that the mechanical properties of the object are adjusted, wherein the at least one thermal influencing device and the application device are fastened to a carriage and fixed relative to one another during applying the liquid metal layerwise onto the plurality of processing zones.

12. The additive manufacturing method according to claim 11, wherein the at least one thermal influencing device is a heating device heating solidified metal in at least a subset of the plurality of processing zones.

13. The additive manufacturing method according to claim 11, wherein the at least one thermal influencing device is a cooling device cooling solidified metal in at least a subset of the plurality of processing zones.

14. The additive manufacturing method according to claim 11, wherein the at least one thermal influencing device is a heating device and a cooling device heating and cooling, respectively, solidified metal in at least a subset of the plurality of processing zones.

15. The additive manufacturing method according to claim 14, wherein the application device and the at least one thermal influencing device are aligned simultaneously with each of the plurality of processing zones, and the at least one thermal influencing device controls the temperature of solidified metal in each of the plurality of processing zones before the application device is aligned with another one of the plurality of processing zones.

16. A method of additive manufacturing a metallic object, the method comprising:
applying liquid metal layerwise on a base using an application device aligned successively with a plurality of processing zones of the base, wherein the liquid metal is applied locally and solidifies on each of the plurality of processing zones; and
controlling temperature of solidified metal on at least a subset of the plurality of processing zones as a function of time with at least one thermal influencing device aligned successively with the plurality of processing zones such that a localized microstructure and mechanical properties of the object are adjusted, wherein the at least one thermal influencing device and the application device are fastened to a carriage and fixed relative to one another during manufacture of the object.

17. The additive manufacturing method according to claim 16, wherein the at least one thermal influencing device is a heating device and a cooling device heating and cooling, respectively, solidified metal in at least a subset of the plurality of processing zones.

18. The additive manufacturing method according to claim 17, wherein the application device and the at least one thermal influencing device are aligned simultaneously with each of the plurality of processing zones, and the at least one thermal influencing device controls the temperature of solidified metal in each of the plurality of processing zones before the application device is aligned with another one of the plurality of processing zones.

19. A method of additive manufacturing a metallic object, the method comprising:
applying liquid metal layerwise onto a plurality of processing zones on a base using an application device aligned successively with the plurality of processing zones, wherein the liquid metal is applied locally and solidifies on each of the plurality of processing zones; and
controlling temperature of solidified metal on at least a subset of the plurality of processing zones as a function of time with a heating device and a cooling device aligned successively with the plurality of processing zones such that a localized microstructure and mechanical properties of the object are adjusted, wherein at least one thermal influencing device and the application device are fastened to a carriage and fixed relative to one another during manufacture of the object.

20. The additive manufacturing method according to claim 19, wherein the application device, the heating device, and the cooling device are aligned simultaneously with each of the plurality of processing zones, and at least one of the heating device and the cooling device controlling the temperature of solidified metal in one of the plurality of processing zones where the liquid metal is applied locally before the application device is aligned with another one of the plurality of processing zones.

* * * * *